Sept. 14, 1937.  H. COULLERY  2,093,033

CINEMATOGRAPHIC APPARATUS

Filed July 21, 1934

H. Coullery
INVENTOR

By: Marks & Clerk
ATTYS.

UNITED STATES PATENT OFFICE 2,093,033

CINEMATOGRAPHIC APPARATUS

Henri Coullery, La Chaux de Fonds, Switzerland

Application July 21, 1934, Serial No. 736,430
In Switzerland July 27, 1933

1 Claim. (Cl. 88—18.8)

This invention relates to cinematographic apparatus.

It is an object of the invention to provide a cinematographic apparatus having a small volume so as to be capable of even being carried in a pocket and to take or reproduce animated scenes of relatively short duration.

A further object of the invention is the provision of a cinematographic apparatus using a disk-shaped film on which the images are disposed according to a spiral about the center of the disk, a magnifying glass being provided for viewing the film which is made to move so that all the images disposed along the spiral pass in the field of vision of the magnifying glass.

A further object is the provision of a driving device for imparting to the disk-shaped film a combined rotary and translatory motion whereby the images disposed along the spiral will be passed successively in the field of vision of the magnifying glass.

In the accompanying drawing, showing a preferred form of embodiment of the invention, Figure 1 is a fragmentary plan view showing the film in position in the apparatus.

Figure 1:
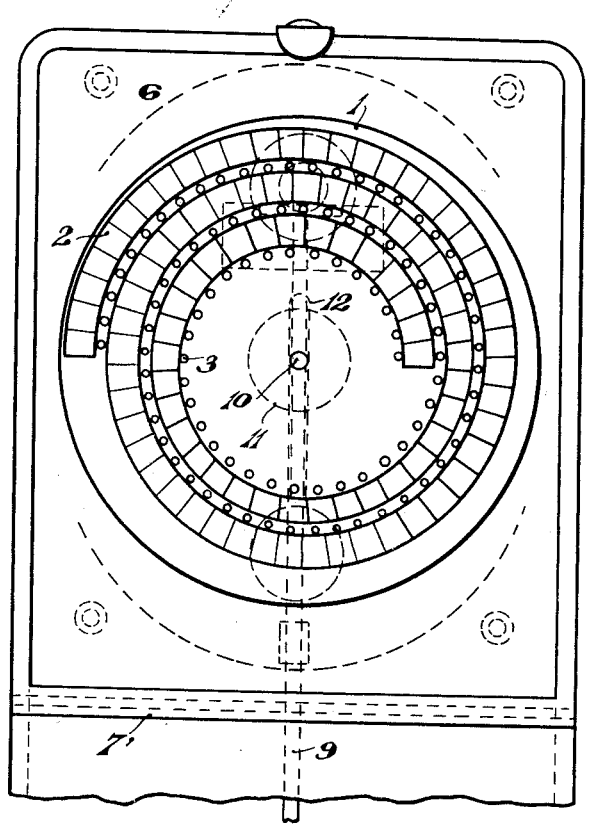
Figure 2:
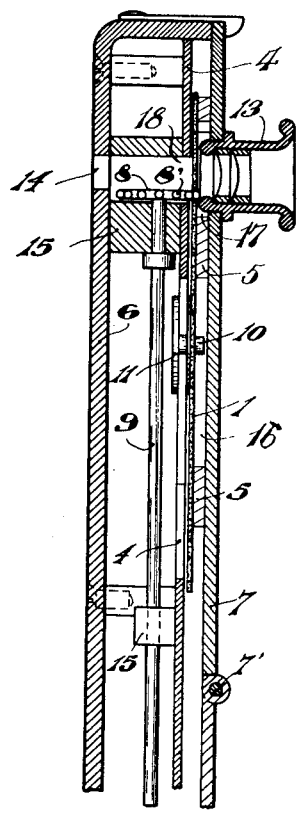
Figure 2 is a longitudinal section through the apparatus.
Figure 3:
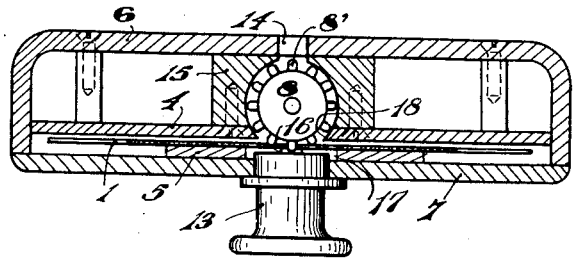
Figure 3 is a cross section through the apparatus.

A circular disk-shaped film carries a large number of relatively small individual images 2, disposed along a spiral (a spiral of Archimedes or an involute of a circle) the center of which coincides with the center of the circular disk 1. A perforation 3 is provided adjacent to each image in the film, these perforations forming a spiral extending parallel to the spiral of the images. The film is maintained between two plates 4 and 5 which are partially coated with velvet and between which the film 1 is freely movable. The plate 4 is carried by a casing 6 constituting the frame of the apparatus. The plate 5 is secured to a cover 7 which is hinged to the casing at 7' and which may be opened to place the film in the apparatus.

The driving device for the film comprises a wheel 8 which is provided along its periphery with small teeth or pins 8' and carried by a shaft 9. The wheel 8 is disposed in proximity of an open rectangular passage 14 provided in the casing for the light rays destined to traverse the film. The shaft 9 is journaled in bearings 15 so as to have no sensible play in axial direction. The teeth or pins 8 are shaped to engage with the perforations 3 in the film. The disk 1 is perforated in its center and is fitted on a pin 10 provided on a slide 11 capable of moving along a slot 12 provided in the plate 4.

The plate 5 is provided with a slot 16 to accommodate the end of the pin 10, and with an aperture 17 for accommodation of the inner end of the lens mount 13. The plate 4 is provided with an aperture 18, which, together with the passage 14 and the aperture 17 allow the light rays to pass across the film 1 and the lens mount 13.

The shaft 9 may be rotated by means of a not represented motor, such as a hand operated crank, an electric or a spring motor, having the necessary wheels and devices for imparting to the shaft 9 an intermittent movement of rotation, such as is well known in the actual cinematographic apparatus for advancing the film.

After a film has been placed on the pin 10 and the cover 7 is closed, the shaft 9 will be rotated and the wheel 8, owing to the engagement of the teeth 8' in the perforations 3 disposed along a spiral the radius of which is gradually changing, makes the film turn and simultaneously effect a rectilinear movement of translation in a plane of the wheel 8. An objective or magnifying glass 13 is carried by the cover 7 of the apparatus, and situated opposite to the passage 14 in the casing. The combined movement of rotation and translation imparted to the film 1, makes all the individual images 2 successively pass in the field of vision of the magnifying glass 13. Each image stops an instant in front of the magnifying glass during the period of rest of the intermittent movement of rotation and is maintained by the teeth of the wheel 8 in the position corresponding to the exact superposition of the retinal impressions, which is necessary for a perfect reproduction of the film.

When all the images of the film have passed in front of the objective, the disk 1 has made a number of revolutions corresponding to the number of turns of the spiral of the images. The total movement of translation is then equal to the difference between the longest and the shortest radius of the spiral. The initial and the final position of the disk are indicated in dotted lines in Fig. 1.

The represented apparatus acts as magnifying means for direct observation of the moving pictures. The optical parts of the apparatus could be modified within the scope of the invention, so that it could be utilized as camera for taking moving pictures, or as projection apparatus.

The advantage of the represented apparatus resides in the fact that it does not require any spools for film reels with their complicated driving machanism which could not be placed in a casing small enough to be used as pocket apparatus. Instead of using film reels, small, plane films in disk shape are utilized which are not very delicate, but are cheap, and can be quickly placed in the apparatus or exchanged, and which are easy to pack, to file, to store and to transport. For this reason, the apparatus according to the invention will be particularly useful as a means of publicity and information by the moving picture, and can be advantageously employed by the industry, commerce or the art, as well as for general public use.

I claim:—

In cinematographic apparatus, the combination of a casing, a film carrier rectilinearly movable within the casing, a disk-shaped film provided with a spirally arranged series of perforations and with a perforation in the center thereof loosely engaging the film carrier, said casing being provided with a cover member adapted to be opened for placing the film onto or removing it from the film carrier, a lens mount carried by said cover member and disposed at one side of the film, a plate secured to the cover member and bearing against one face of the film when the cover member is closed for guiding and maintaining the film during movement thereof, a plate disposed on the other side of the film and provided with a slot engaging the film carrier, said two plates being provided with apertures forming a passage for the light rays passing across the lens mount and the film, and a rotatable wheel disposed opposite the lens mount on the other side of the film in proximity of said passage, said wheel being provided with pins radially projecting from the periphery thereof to engage with the perforations of the film.

HENRI COULLERY.